United States Patent
Tan et al.

(10) Patent No.: US 6,593,017 B1
(45) Date of Patent: Jul. 15, 2003

(54) HIGH CAPACITY CALCIUM LITHIUM BASED HYDROGEN STORAGE MATERIAL AND METHOD OF MAKING THE SAME

(75) Inventors: Zhaosheng Tan, Troy, MI (US); Krishna Sapru, Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/059,778

(22) Filed: Jan. 30, 2002

(51) Int. Cl.⁷ ................................................. H01M 8/18
(52) U.S. Cl. ............................. 429/19; 429/13; 429/17; 423/646; 423/648.1; 423/658.2; 423/644; 419/10; 252/188.26
(58) Field of Search ............................. 429/13, 17, 19; 423/644, 646, 648.1, 658.2; 419/10; 252/188.26

(56) References Cited

U.S. PATENT DOCUMENTS

| | | | | |
|---|---|---|---|---|
| 3,366,453 A | * | 1/1968 | Kloepfer et al. | 23/204 |
| 6,251,349 B1 | * | 6/2001 | Zaluska et al. | 423/646 |
| 6,368,735 B1 | * | 4/2002 | Lomax et al. | 429/19 |
| 6,514,478 B2 | * | 2/2003 | Zaluska et al. | 423/646 |

FOREIGN PATENT DOCUMENTS

| | | | |
|---|---|---|---|
| GB | 0405017 | * | 1/1934 |
| GB | 2264112 | * | 8/1993 |

* cited by examiner

*Primary Examiner*—Bruce F. Bell
(74) *Attorney, Agent, or Firm*—Frederick W. Mau, II; David W. Schumaker; Marvin S. Siskind

(57) ABSTRACT

A nonreversible metal hydride for use as a hydrogen fuel. The nonreversible metal hydride is formed from an intermetallic compound having the formula $Ca_{1+a}Li_{2+b}$. The $Ca_{1+a}Li_{2+b}$ is formed by melting amounts of elemental lithium and calcium together by induction heating in an argon atmosphere. The $Ca_{1+a}Li_{2+b}$ is cooled and crushed into a powder. The alloy powder is subsequently hydrogenated at ambient temperatures or lower. Resulting is a metal hydride having exceptional reactivity to water during hydrolysis due to its nano-crystalline structure. Dehydrogenation of the metal hydride does not regularly occur due to the absorbed hydrogen being chemically bonded to the lithium and calcium. The $Ca_{1+a}Li_{2+b}$ hydride may be used in a variety of applications as a hydrogen fuel and the $Ca_{1+a}Li_{2+b}$ alloy may be used as a desiccant for removing moisture from hydrogen or hydrogen containing streams.

20 Claims, 2 Drawing Sheets

HIGH CAPACITY CALCIUM LITHIUM BASED HYDROGEN STORAGE MATERIAL AND METHOD OF MAKING THE SAME

FIELD OF THE INVENTION

The present invention relates generally to nonreversible metal hydrides used to store and release hydrogen. More particularly the present invention relates to nonreversible metal hydrides as a type of hydrogen fuel for use in a variety of design applications.

BACKGROUND

As the world's population expands and its economy increases, the atmospheric concentrations of carbon dioxide are warming the earth causing climate change. However, the global energy system is moving steadily away from the carbon-rich fuels whose combustion produces the harmful gas. For nearly a century and a half, fuels with high amounts of carbon have progressively been replaced by those containing less.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The instant invention helps to greatly shorten that period. In the near term, hydrogen will be used in fuel cells for cars, trucks and industrial plants, just as it already provides power for orbiting spacecraft. But ultimately, hydrogen will also provide a general carbon-free fuel to cover all fuel needs including power generation.

In the 1800s, fuel was primarily wood in which the ratio of hydrogen to carbon was about 0.1. As society switched to the use of coal and oil, the ratio of hydrogen to carbon increased first to 1.3 and then to 2. Currently, society is inching closer to the use of methane in which the hydrogen to carbon ratio is further increased to 4 (methane has serious problems with safety, cost and infrastructure). However, the ultimate goal for society is to employ a carbon-free fuel, i.e., the most ubiquitous of elements, pure hydrogen. The obstacle has been the lack of solid state storage capacity and infrastructure.

Hydrogen is the "ultimate fuel." It is inexhaustible. Hydrogen is the most plentiful element in the universe (over 95% of all matter). Hydrogen can provide a clean and sustainable source of energy for our planet and can be produced by various processes which split water into hydrogen and oxygen. The hydrogen can then be stored and transported in solid state form.

While the world's oil reserves are depletable, the supply of hydrogen remains virtually unlimited. Hydrogen, which can be produced from coal, natural gas and other hydrocarbons, is preferably formed via electrolysis of water, more preferably using energy from the sun (see U.S. Pat. No. 4,678,679, the disclosure of which is incorporated herein by reference.) However, hydrogen can also be produced by the electrolysis of water using any other form of economical energy (e.g., wind, waves, geothermal, hydroelectric, nuclear, gasification of biomass, etc.) Furthermore, hydrogen, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependency on oil, etc., as well as providing a means of helping developing nations in sustainable manner.

While hydrogen has wide potential application as a fuel, a major drawback in its utilization, especially in mobile uses such as the powering of vehicles, has been the lack of an acceptable lightweight hydrogen storage medium. Storage of hydrogen as a compressed gas involves the use of large and heavy vessels. Additionally, large and very expensive compressors are required to store hydrogen as a compressed gas and compressed hydrogen gas is a very great explosion/ fire hazzard.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen. Another drawback to storage as a liquid is the costly losses of hydrogen due to evaporation, which can be as high as 5% per day.

Hydrogen can be stored in a solid hydride and can provide a greater percent weight storage than storage as a compressed gas or a liquid in pressure tanks. Also, hydrogen storage in a solid hydride is safe and does not present any of the hazard problems that hydrogen stored in containers as a gas or a liquid does, because hydrogen, when stored in a solid hydride form, exists in its lowest free energy state.

In addition to the problems associated with storage of gaseous or liquid hydrogen, there are also problems associated with the transport of hydrogen in such forms. For instance, transport of liquid hydrogen will require super-insulated tanks, which will be heavy and bulky and will be susceptible to rupturing and explosion. Also, a portion of the liquid hydrogen will be required to remain in the tanks at all times to avoid heating-up and cooling down of the tank which would incur big thermal losses. As for gaseous hydrogen transportation, pressurized tankers could be used for smaller quantities of hydrogen, but these too will be susceptible to rupturing and explosion. For larger quantities, a whole new hydrogen pipeline transportation system would need to be constructed or the compressor stations, valves and gaskets of the existing pipeline systems for natural gas will have to be adapted and retrofitted to hydrogen use. This assumes, of course, that the construction material of these existing pipelines will be suited to hydrogen transportation, which may not be the case.

Both reversible and irreversible solid hydrides may be used as sources of hydrogen. The reversible solid hydrides can be used for many cycles. Once their hydrogen supply is depleted the reversible hydrides are able to reabsorb hydrogen and again be used as a hydrogen supply. Reversible hydrides are generally configured to release hydrogen upon being heated to a specified temperature, therefore heat transfer through the reversible hydrides is a controlling factor.

Unlike the reversible hydrides, the irreversible hydrides can only be used for a single cycle. While the irreversible hydrides have a single cycle life, they do not readily dehydrogenate. The hydrogen is generally chemically bonded within the hydride therefore making the hydride extremely stable. These hydrides are preferably made with alkaline or alkaline earth metals due to the reactivity of the alkaline earth metals with water. Water is introduced to the alkaline or alkaline earth metal hydrides and hydrogen gas is readily generated through hydrolysis. The drawback to using irreversible hydrides is that the hydrolysis reaction yields waste products. The waste products must be removed from the system and the hydride must be replenished to maintain a steady supply of hydrogen.

Metal hydrides easily formed by hydrogenation at ambient temperatures are extremely desirable. Most hydrides are only able to absorb their maximum hydrogen capacity at high temperatures which can be costly. A hydride having small crystallite size is desirable as well. To prepare alloys for optimum reactivity, they must first be ground into fine particles thereby increasing the reactive surface area of the alloy and increasing the reaction efficiency. A hydride having a small crystallite size can be easily ground into fine particles without the need for extensive grinding capability. The fine hydride particles provide the reactivity needed to achieve the desired efficiency. Thermal stability is also a main concern whereas many hydrides begin to dehydrogenate at low temperatures. A hydride where the absorbed hydrogen is chemically bonded within the hydride will be extremely useful due to its exceptional thermal stability. The present invention provides a metal hydride that is able to absorb its maximum hydrogen capacity at ambient temperatures. By forming the hydride at ambient temperatures, the resulting hydride has a nano-crystalline structure thereby enabling the hydride to be easily ground into fine particles. The present invention also has exceptional thermal stability in that the hydrogen is chemically bonded within the hydride. The hydride must be exposed to temperatures well above ambient temperatures to even begin to desorb small amounts of hydrogen. This hydride will be found useful in a wide variety of design applications due to exceptional stability, reactivity, and hydrogenation.

SUMMARY OF THE INVENTION

The present invention discloses a metal hydride fuel. The metal hydride is composed of lithium, calcium, and hydrogen. Hydrogen within the hydride is chemically bonded to the lithium and calcium to form a stable hydride. Gaseous hydrogen is generated when the metal hydride reacts with water by way of hydrolysis.

The metal hydride has the formula of $Ca_{1+a}Li_{2+b}H_{4+c}$, wherein a and b are between −0.5 and 0.5 and c=2a+b. The metal hydride has a nano-crystalline structure where the crystals have a size less than 100 nanometers. The small crystallite size allows the metal hydride to be easily ground into a fine powder. The metal hydride has excellent hydrogen storage capacity having a maximum hydrogen storage capacity of at least 5 percent by weight.

The metal hydride fuel is produced by first creating a lithium calcium alloy by melting elemental lithium and elemental calcium into a metallic mixture. Elemental lithium and calcium are combined in a crucible and heated to just above the melting point of calcium (839° C.) to form a metallic liquid. The metallic liquid is maintained above 300° C. for 10 minutes to produce a homogeneous metallic mixture. The lithium and calcium are heated using a induction furnace with an argon atmosphere. The induction furnace operates at 10,000 Hz thereby mixing the metallic mixture. The metallic mixture is then cooled and formed into ingots. The ingots are ground down into an alloy powder and the alloy powder is hydrogenated at ambient temperatures. The rate of hydrogenation of the alloy may be increased by increasing the pressure of the hydrogen gas. Once hydrogenated, the metal hydride is ready for use as a hydrogen fuel in a variety of applications.

One such application may be in an apparatus used to provide a stream of hydrogen gas. In such an apparatus, the metal hydride is placed into a vessel having an inlet and an outlet. The inlet may be adapted to introduce a controlled amount of water to the metal hydride. The water may be in liquid or mist form. The water contacts the metal hydride and gaseous hydrogen is generated. The gaseous hydrogen then travels through the outlet and may be used as a source of fuel. Such an application may be used to provide gaseous hydrogen to a fuel cell used to power a vehicle or distributed and stationary power generation.

DETAILED DESCRIPTION OF THE INVENTION

Figure 1:
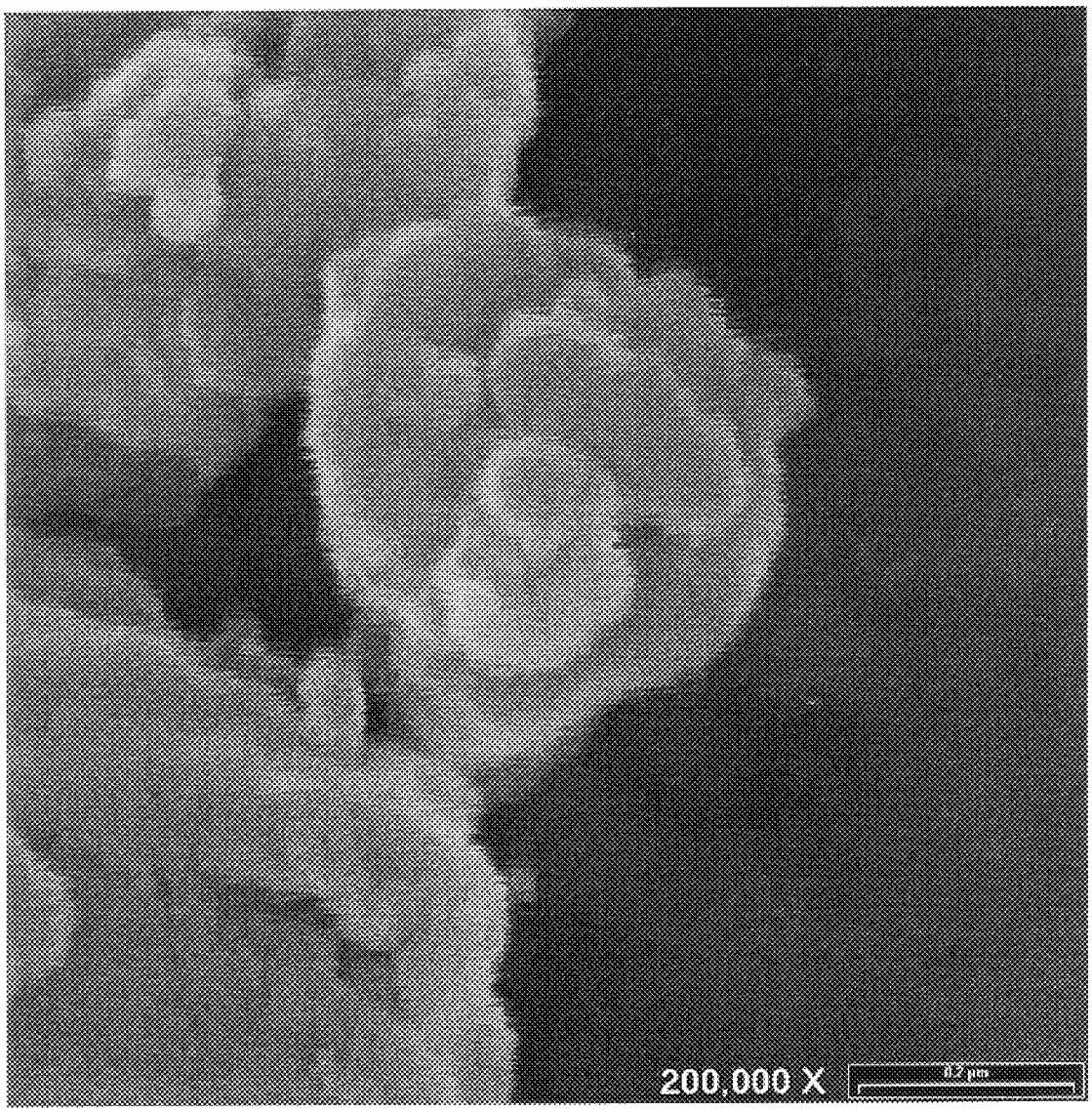
FIG. 1, is a SEM image showing the particle size of the hydride of the present invention.

The present invention discloses an irreversible hydrogen storage alloy capable of absorbing hydrogen at ambient temperatures or lower. The hydrogen storage alloy is able to absorb approximately 7 percent by weight hydrogen at such conditions. The hydrogen storage alloy does not need activation prior to hydrogenation.

The resulting metal hydride formed from the absorption of hydrogen at ambient temperatures has a nano-crystalline structure. The ambient temperatures play a key role in the production of the nano-crystalline structure. If the hydrogenation is carried out at higher temperatures, a larger crystallite size would be formed in the structure. Due to the nano-crystalline structure of the metal hydride, the metal hydride demonstrates exceptional reactivity thus allowing the metal hydride to be used with relative ease in a variety of applications as a hydrogen fuel. The metal hydride is extremely stable and dehydrogenation does not occur at room temperature. The metal hydride is very stable in that the absorbed hydrogen is chemically bonded inside the hydride. No dehydrogenation occurs at temperatures under 350° C. To release the hydrogen for use as fuel, water is introduced to the metal hydride and hydrogen gas is formed by way of hydrolysis.

Irreversible alloys as disclosed in the prior art have not been able to demonstrate such unique properties at ambient temperatures as those shown by the present invention. The prior art reference GB 2,264,112A discloses hydrogen generating compositions containing up to 50 percent calcium hydride or lithium hydride, however the compositions require the use of sodium chloride to passivate the hydride and release hydrogen in a controlled manner. Another prior art reference U.S. Pat. No. 3,366,453 teaches lithium hydride and calcium hydride alone, however, alone these hydrides do not possess the properties of the present invention and require high temperatures for hydrogenation. The present invention does not need activation and readily absorbs hydrogen at ambient temperatures thus permitting hydrogenation without the need for vessels operating at high temperatures and pressures. The present invention is also extremely stable and dehydrogenation of the metal hydride does not occur in the absence of water at room temperature. When introduced to water, the present invention provides a controlled amount of hydrogen for use in a wide variety of design applications.

The hydrogen storage alloy may be composed of lithium and calcium. The alloy may have the formula $Ca_{1+a}Li_{2+b}$ with a and b being in between −0.5 and 0.5. To create the alloy, elemental lithium and calcium may be placed inside a crucible and melted to form a uniform mixture of metallic liquid. The majority phase of the hydrogen storage alloy is intermetallic $CaLi_2$. The $CaLi_2$ crystals have a hexagonal structure. The ingots of $Ca_{1+a}Li_{2+b}$ alloy show brittleness and are easily crushed into smaller pieces. The ingots of $CaLi_2$ also have a slower oxidation rate as compared to lithium, due to their increased chemical stability. The $Ca_{1+a}Li_{2+b}$ alloy instantaneously absorbs hydrogen at ambient temperatures or lower without activation to form a hydride having the formula $Ca_{1+a}Li_{2+b}H_{4+c}$, where a and b are between −0.5 and 0.5 and c=2a+b. The rate of hydrogen absorption is dependant on the hydrogen gas pressure. The higher the gas pressure, the higher the rate of hydrogenation. At 150 psig, the hydrogen storage alloy absorbs its total capacity in approximately 24 hrs, with half of the absorption occurring after approximately 5 hrs. At 1000 psig, the hydrogen storage alloy absorbs its total capacity within approximately 5 hrs.

The fully hydrogenated $Ca_{1+a}Li_{2+b}H_{4+c}$ hydride is dark in color. When hydrogenation of the alloy occurs at ambient temperatures, the $Ca_{1+a}Li_{2+b}$ alloy forms the $Ca_{1+a}Li_{2+b}H_{4+c}$ hydride having a nano-crystalline structure due to restrictive growth during hydrogenation. When hydrogenation occurs at higher temperatures the hydride forms with a substantially larger crystalline structure. The temperatures may be controlled to form hydrides with differing crystal sizes for use in different applications. The nano-crystalline structure of the $Ca_{1+a}Li_{2+b}$ hydride provides exceptional reactivity due to the size of the crystals. The $Ca_{1+a}Li_{2+b}H_{4+c}$ hydride consists of two segregated metal hydrides, LiH and $CaH_2$. The LiH is in cubic structure and the $CaH_2$ is in orthorhombic structure. The $CaH_2$ has an average crystal size of 24 nanometers and the LiH has an average crystal size of 29 nanometers. The $Ca_{1+a}Li_{2+b}H_{4+c}$ hydride has a particle size less than 100 nanometers as shown in FIG. 1. The $Ca_{1+a}Li_{2+b}H_{4+c}$ hydride is extremely easy to crush into small particles due to the small size of the crystals. This characteristic of the nano-crystalline structure renders the mechanism possible for controllable hydrogen generation by hydrolysis. Due to the small size of the hydride particles, the hydride is very sensitive to the moisture present in air. An argon environment is preferred for storage of the hydride material. Similar environments may be employed as well.

The $Ca_{1+a}Li_{2+b}H_{4+c}$ hydride reacts with water to form hydrogen gas by way of hydrolysis. The hydrolysis reaction of fully hydrogenated $CaLi_2$ compound can be expressed as:

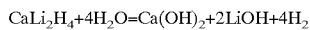

$$CaLi_2H_4 + 4H_2O = Ca(OH)_2 + 2LiOH + 4H_2$$

This reaction releases 8 hydrogen atoms for every formula $CaLi_2H_4$. The stoichiometric $CaLi_2$ compound has maximum hydrogen storage capacity of 6.45 percent as calculated as a ratio of H/(H+M) where M represents the intermetallic alloy. By adding water to the fully hydrogenated $CaLi_2$ compound, the hydrogen capacity is 13.8 weight percent without accounting for the water and 6.15 weight percent with the water weight considered.

As a byproduct of the hydrolysis reaction, calcium hydroxide and lithium hydroxide are formed. With these compounds no longer being able to release hydrogen, these compounds must be removed from the system preventing any buildup. The compounds may then be recycled back into the above mentioned alloy and the process repeated.

The alloy of the present invention may be formed by induction heating in an argon atmosphere. By this method, elemental calcium and lithium are placed into a crucible and heated to a temperature slightly higher than the melting point of calcium (839° C.). Inside the crucible, the lithium is placed on the bottom and the calcium is placed over the lithium to help prevent vaporization of the lithium. Once heated, the mixture is maintained at a temperature above 300° C. for approximately 10 minutes to yield a uniform mixture of metallic liquid. The induction frequency of the furnace is approximately 10,000 Hz, thereby electromagnetically mixing the metallic liquid. The crucible may be composed of materials such as stainless steel and magnesium oxide. However, other materials may be substituted provided that the materials have a negligible reaction with the melted materials.

The melted metal mixture is then allowed to cool and formed into ingots. The cooled $Ca_{1+a}Li_{2+b}$ alloy is very brittle and easy to grind into small particles. The cooled ingots are then crushed into a powder using a ball mill, a grinder, or other machines well known in the art.

The $Ca_{1+a}Li_{2+b}$ alloy powder then undergoes hydrogenation to form the $Ca_{1+a}Li_{2+b}H_{4+c}$ hydride. Hydrogen is introduced to the $Ca_{1+a}Li_{2+b}$ alloy at ambient temperatures or lower to produce the nano-crystalline structure of the $Ca_{1+a}Li_{2+b}H_{4+c}$ hydride. During hydrogenation heat is released and the temperature of the reactor is increased. If the $Ca_{1+a}Li_{2+b}$ alloy is hydrogenated at higher temperatures, larger crystalline structures will form thereby increasing the work needed to reduce the $Ca_{1+a}Li_{2+b}H_{4+c}$ hydride to small particulate fines. The small particle size of the $Ca_{1+a}Li_{2+b}H_{4+c}$ hydride is essential because larger particle size reduces the reactivity of the $Ca_{1+a}Li_{2+b}H_{4+c}$ hydride. To prevent the growth of larger crystallites, cooling means may be utilized to keep the reactor maintained at ambient temperatures. Such cooling means may include heat exchangers or other devices well known in the art. The pressure of the hydrogen gas dictates the speed of absorption of the hydrogen into the $Ca_{1+a}Li_{2+b}$ alloy. A higher pressure of the hydrogen gas produces a higher rate of hydrogenation. At 150 psig, the alloy absorbs approximately half of its maximum capacity in 5 hours and its maximum capacity is reached in approximately 24 hours. At 1000 psig the $Ca_{1+a}Li_{2+b}$ alloy absorbs its maximum capacity of hydrogen in approximately 5 hours. Hydrogen pressures inside and outside this range may be substituted to comply with design requirements.

The $Ca_{1+a}Li_{2+b}H_{4+c}$ hydride produced in accordance with the present invention may be used in a variety of applications to produce a stream of hydrogen gas. In such an application, the $Ca_{1+a}Li_{2+b}H_{4+c}$ hydride is placed inside a vessel having a gaseous hydrogen outlet and a water inlet. Water is introduced to the $Ca_{1+a}Li_{2+b}H_{4+c}$ hydride and hydrogen is produced through hydrolysis. In such applications, it is preferable that the water be introduced to the $Ca_{1+a}Li_{2+b}H_{4+c}$ hydride in small controlled amounts to provide control of the release of the hydrogen from the $Ca_{1+a}Li_{2+b}H_{4+c}$ hydride. Preferably a fine mist of water is used, however other methods may be employed. Once released from the hydride, the hydrogen exits the vessel through the outlet and is available for use. Such an apparatus is disclosed in U.S. Pat. No. 4,155,712 the disclosure of which is herein incorporated by reference.

The above described apparatus may be used to provide hydrogen to a fuel cell used to power a vehicle. Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the anode for hydrogen oxidation and the cathode for oxygen reduction, both being positioned in a cell containing an electrolyte (such as an alkaline electrolytic solution). Typically, the reactants, such as hydrogen and oxygen, are respectively fed through a porous anode and cathode and brought into surface contact with the electrolytic solution. The particular materials utilized for the cathode and anode are important since they must act as efficient catalysts for the reactions taking place.

The anode active material of the fuel cell may be a composite of a hydrogen storage material and an additional catalytic material. The preferable hydrogen storage alloy is one which can reversibly absorb and release hydrogen irrespective of the hydrogen storage capacity and has the properties of a fast hydrogenation reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metallic alloys, zirconium and/or titanium alloys or mixtures thereof. The anode material may even be layered such that the material on the hydrogen input surface is formed from a material which has been specifically designed to be highly catalytic to the dissociation of molecular hydrogen into atomic hydrogen, while the material on electrolyte interface surface is designed to be highly catalytic to the formation of water from hydrogen and hydroxyl ions.

Certain hydrogen storage materials are exceptionally useful as alkaline fuel cell anode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the anode; 2) as a water formation catalyst, forming water from hydrogen and hydroxyl ions (from the aqueous alkaline electrolyte); and 3) as a an internal hydrogen storage buffer to insure that a ready supply of hydrogen ions is always available.

Specific alloys useful as the anode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The most preferred alloys having enriched Ni regions are alloys having the following composition:

(Base Alloy)$_a$Co$_b$Mn$_c$Fe$_d$Sn$_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

It is preferable that the substrate component act as both an electrical conductor and a support structure. The electrode may be formed by pressing active material into a porous metal substrate. The conductivity of the electrode can be increased by increasing the conductivity of the electrode's porous metal substrate. Generally the porous metal substrate includes, but is not limited to, meshes, grid, matte, foil, foam, plate, and expanded metal. Preferably, the porous metal substrate used for the electrode is a mesh, grid, foam, or expanded metal. The substrate may be formed from any material which is electrically conductive and resistant to corrosion or chemical attack by the electrolyte. Nickel or nickel alloy is a very good material, but for high power applications it may be too resistive. Thus when high power is required, the substrate is formed from copper, copper-plated nickel, or a copper-nickel alloy, as taught by U.S. Pat. No. 5,856,047 (Venkatesan, et al.) and U.S. Pat. No. 5,851,698 (Reichman et al.), the disclosures of which are hereby incorporated by reference. As used herein, "copper" refers to either pure copper or an alloy of copper, and "nickel" refers to either pure nickel or an alloy of nickel. Using copper to form the porous metal substrate of the electrode has several important advantages. Copper is an excellent electrical conductor. Hence, its use as a substrate material decreases the resistance of the anode. This decreases the amount of fuel cell power wasted due to internal dissipation, and thereby provides a fuel cell having increased output power. Copper is also a malleable metal. Increased substrate malleability allows the substrate to more reliably hold the active hydrogen storage material that is compressed onto the substrate surface. This lessens the need to sinter the electrode after the active material has been compressed onto the substrate, thereby simplifying and reducing the cost of the anode manufacturing process.

The cathode may contain an active material component which is catalytic to the dissociation of molecular oxygen into atomic oxygen, catalytic to the formation of hydroxyl ions (OH$^-$) from water and oxygen ions, corrosion resistant to the electrolyte, and resistant to poisoning. A material which is useful as an active material in the cathode is one which is structurally modified by the incorporation of at least one modifier element to enhance its catalytic properties. Such materials are disclosed in U.S. Pat. No. 4,430,391 ('391) to Ovshinsky, et al., published Feb. 7, 1984, the disclosure of which is hereby incorporated by reference. Such a catalytic body is based on a disordered non-equilibrium material designed to have a high density of catalytically active sites, resistance to poisoning and long operating life. Modifier elements, such as La, Al, K, Cs, Na, Li, C, and O structurally modify the local chemical environments of the host matrix including one or more transition elements such as Mn, Co and Ni to form the catalytic materials of the cathode. These low over-voltage, catalytic materials increase operating efficiencies of the fuel cells in which they are employed.

The cathode is formed the same as conventional cathodes which use platinum catalysts, but the non-noble-metal catalysts described above are substituted for the platinum. The non-noble catalysts are finely divided and disbursed throughout a porous carbon matte-like material. The material may or may not have a conductive substrate as needed. If used the substrate can be as described herein above.

In an alkaline fuel cell, the reaction at the anode occurs between the hydrogen fuel and hydroxyl ions (OH$^-$) present in the electrolyte, which react to form water and release electrons:

$$H_2 + 2OH^- \rightarrow 2H_2O + 2e^-.$$

At the cathode, the oxygen, water, and electrons react in the presence of the cathode catalyst to reduce the oxygen and form hydroxyl ions (OH$^-$):

$$O_2 + 2H_2O + 4e^- \rightarrow 4OH^-.$$

The flow of electrons is utilized to provide electrical energy for a load externally connected to the anode and cathode.

It should be noted that the anode catalyst of the alkaline fuel cell is required to do more than catalyze the reaction of $H^-$ ions with $OH^-$ ions to produce water. Initially the anode must catalyze and accelerate the formation of $H^+$ ions and $e^-$ from $H_2$. This occurs via formation of atomic hydrogen from molecular hydrogen. The overall reaction can be seen as (where M is the catalyst):

$$M + H_2 \rightarrow 2MH \rightarrow M + 2H^+ + 2e^-.$$

Thus the anode catalyst must not only efficiently catalyze the formation of water at the electrolyte interface but must also efficiently dissociate molecular hydrogen into ionic hydrogen. Using conventional anode material, the dissociated hydrogen is transitional and the hydrogen atoms can easily recombine to form hydrogen if they are not used very quickly in the oxidation reaction. With the hydrogen storage anode materials of the inventive instant startup fuel cells, hydrogen is trapped in hydride form as soon as they are created, and then are used as needed to provide power. Such a fuel cell is disclosed in U.S. application Ser. No. 09/524,116, entitled "A Novel Alkaline Fuel Cell" filed on Mar. 13, 2000 for Ovshinsky, et al., which is herein incorporated by reference.

The $Ca_{1+a}Li_{2+b}$ alloy may also be used as a desiccant to remove moisture from hydrogen or hydrogen containing gases. In such an application, the $Ca_{1+a}Li_{2+b}$ hydride may be positioned to contact the gas in a variety of locations throughout a particular system. Due to the ability of the $Ca_{1+a}Li_{2+b}$ to readily absorb hydrogen at ambient temperatures, the $Ca_{1+a}Li_{2+b}$ alloy may find use in a variety of design applications.

EXAMPLE

Figure 2:
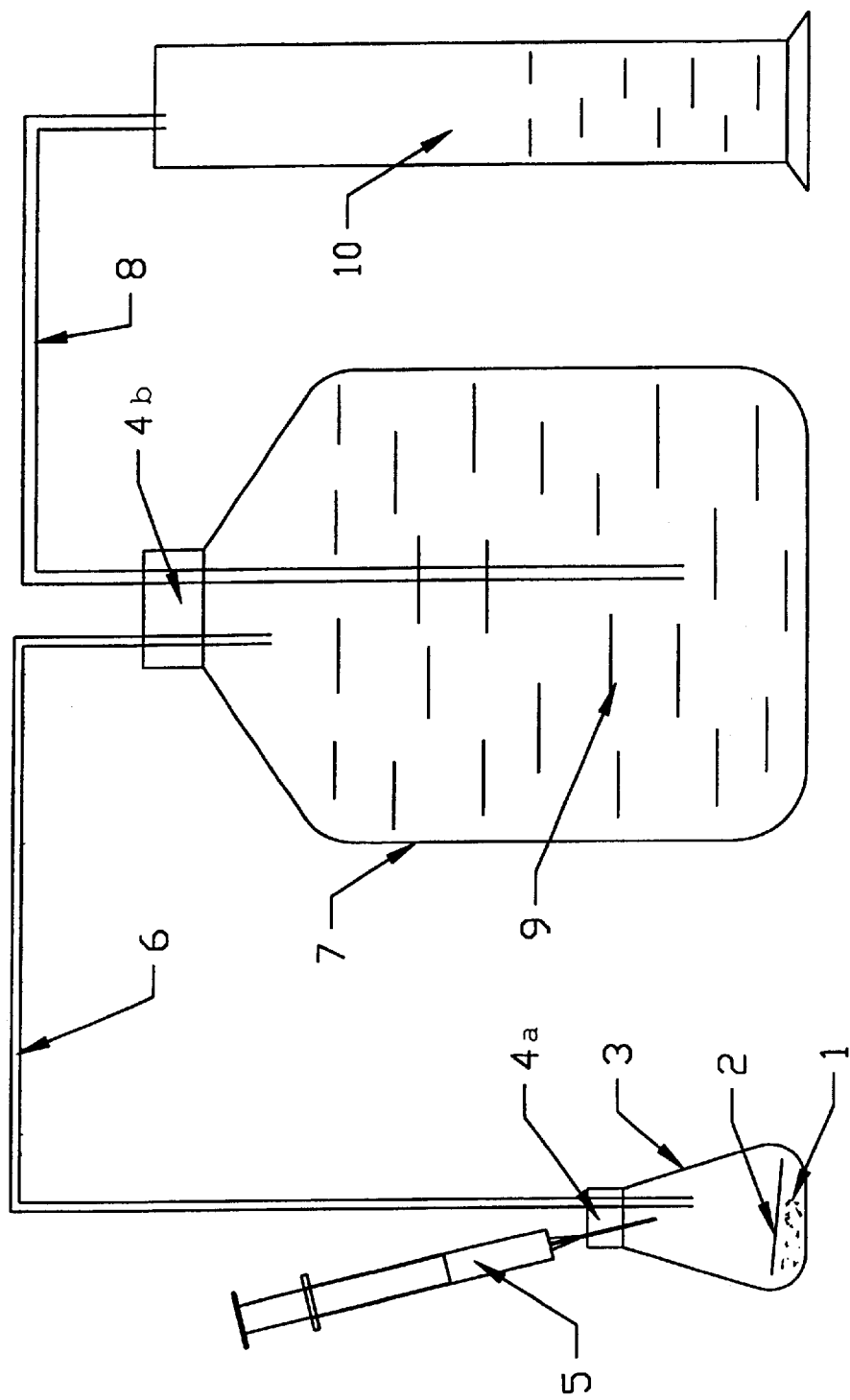
FIG. 2, is a diagram of the apparatus used to test the present invention.

An experiment of the hydrolysis for $Ca_{30}Li_{70}$ hydride has been conducted with a set-up shown in FIG. 2. $Ca_{30}Li_{70}$ hydride is ground into powder 1 and wrapped into a paper filter bag 2. The bag 2 is then placed in the bottom of a flask 3. The process is carried out in an argon environment with zero ppm oxygen and 1.70 ppm moisture. The loaded flask 3 is capped by a silicon stop 4a with an aluminum tube 6 (3/32 inch diameter) passing through to transfer the hydrogen gas into a one gallon glass bottle 7. A syringe 5 is pushed through the silicon stopper 4a and is used to inject water into the flask 3. The flask 3 is sealed inside the argon environment with 1½ feet of aluminum tubing 6 extending from the flask 3. The one gallon glass bottle 7 is capped with a silicon stopper 4b having two holes. The aluminum tubing 6 extending from the flask 3 is inserted through one hole and extended approximately half way down the bottle 7. A second piece of aluminum tubing 8 is inserted through the second hole extending down to the bottom of the one gallon bottle 7. The other end of the second piece of the aluminum tubing 8 runs from the one gallon bottle 7 to a graduated cylinder 10. The one gallon bottle 7 is then filled with water 9.

As the water from the syringe 5 is injected into the flask 3, it drips onto the filter bag 2 containing the powder $Ca_{30}Li_{70}$ hydride 1. The water comes into contact with the $Ca_{30}Li_{70}$ hydride via liquid or vapor transmitted through the filter bag 2. Once the $Ca_{30}Li_{70}$ hydride 1 is contacted by the water, hydrolysis immediately begins thus releasing hydrogen gas. The hydrogen gas exits the flask 3 and enters the one gallon bottle 7 through the aluminum tubing 6. While the hydrogen gas accumulates at the top of the one gallon bottle 7, water is forced out of the one gallon bottle and empties into the graduated cylinder 10. The water displaced by the gas is equal to the volume of the hydrogen gas. The displaced water is then measured in the graduated cylinder and the amount of hydrogen produced can be calculated.

The tested $Ca_{30}Li_{70}$ hydride was hydrogenated at ambient temperature under a pressure of 500 psig for a duration of 12 hours. The weight of the $Ca_{30}Li_{70}$ used in the experiment was 1.130 grams. Deionized water was injected into the flask to react with the $Ca_{30}Li_{70}$ hydride via hydrolysis. The total amount of hydrogen produced by the reaction was 1659.5 cubic centimeters, which is 95 percent of the theoretical hydrogen production from stoichiometric $CaLi_2H_4$.

What is claimed is:

1. A metal hydride fuel which reacts with water to generate gaseous hydrogen, consisting essentially of calcium, lithium, and hydrogen.

2. The metal hydride according to claim 1, having the formula of $Ca_{1+a}Li_{2+b}H_{4+c}$, wherein a and b are between −0.5 and 0.5 and c=2a+b.

3. The metal hydride according to claim 2, wherein said metal hydride has a nano-crystalline structure.

4. The metal hydride according to claim 3, wherein said metal hydride has a crystal size less than 100 nanometers.

5. The metal hydride according to claim 2, wherein said metal hydride has a maximum hydrogen storage capacity of at least 5 percent by weight.

6. The metal hydride according to claim 2, wherein said metal hydride has a maximum hydrogen storage capacity of at least 6 percent by weight.

7. The metal hydride according to claim 2, wherein said metal hydride has a maximum hydrogen storage capacity of at least 6.75 percent by weight.

8. The metal hydride according to claim 2, wherein said hydrogen is chemically bonded to said lithium and said calcium.

9. A method for producing a metal hydride fuel comprising:

melting elemental lithium and elemental calcium in a crucible;

mixing said melted elemental lithium and said melted elemental calcium to form a metallic liquid;

cooling said metallic liquid into a plurality of alloy ingots;

grinding said alloy ingots into an alloy powder;

hydrogenating said alloy powder at ambient temperatures or lower.

10. The method according to claim 9, wherein said elemental lithium is placed in the bottom of said crucible and said elemental calcium is placed on top of said lithium.

11. The method according to claim 10, wherein said elemental lithium and said elemental calcium are heated to a temperature slightly higher than 839° C. in an argon atmosphere.

12. The method according to claim 11, wherein said elemental lithium and said elemental calcium are maintained at a temperature above 300° C. for approximately 10 minutes.

13. The method according to claim 11, wherein said elemental lithium and said elemental calcium are heated using an induction furnace.

14. The method according to claim 13, wherein said induction furnace operates at a frequency of 10,000 Hz.

15. The method according to claim 10, wherein said crucible is comprised of stainless steel.

16. The method according to claim 10, wherein said crucible is comprised of magnesium oxide.

17. The method according to claim 9, wherein a maximum hydrogen storage capacity of said alloy is achieved in 24 hours at 150 psig.

18. The method according to claim 9, wherein a maximum hydrogen storage capacity of said alloy is achieved in 5 hours at 1000 psig.

19. An apparatus for providing a hydrogen fuel comprising:

- a metal hydride having the formula $Ca_{1+a}Li_{2+b}H_{4+c}$, wherein a and b are between −0.5 and 0.5 and c=2a+b;
- a vessel containing said metal hydride, wherein said vessel has an inlet and an outlet;
- said inlet adapted to introduce a controlled amount of water to said metal hydride;
- said outlet adapted to provide hydrogen gas;
- said controlled amount of water having a liquid or vapor form.

20. An apparatus for powering a vehicle comprising:

- a metal hydride having the formula $Ca_{1+a}Li_{2+b}H_{4+c}$, wherein a and b are between −0.5 and 0.5 and c=2a+b;
- a vessel containing said metal hydride, wherein said vessel has an inlet and an outlet; and
- a fuel cell, wherein said fuel cell provides an electrical current in response to a hydrogen stream, an oxygen stream, and an electrolyte stream;
- said inlet adapted to provide a controlled amount of water to said metal hydride;
- said outlet adapted to provide hydrogen gas to said fuel cell;
- said controlled amount of water having a liquid or vapor form; and
- said fuel cell adapted to power said vehicle.

* * * * *